Oct. 15, 1968 A. G. BODOH ET AL 3,405,946

AUTOMATIC PHONOGRAPH STYLUS CLEANING

Filed Oct. 22, 1965

INVENTORS.
ALBINUS G. BODOH
RAYMOND L. GUSTAVEL
BY
Ronald L. Engel
ATTY.

3,405,946

AUTOMATIC PHONOGRAPH STYLUS CLEANING

Albinus G. Bodoh, Prospect Heights, and Raymond L. Gustavel, Itasca, Ill., assignors to The Seeburg Corporation, Chicago, Ill., a corporation of Delaware
Filed Oct. 22, 1965, Ser. No. 501,872
8 Claims. (Cl. 274—47)

ABSTRACT OF THE DISCLOSURE

An apparatus for automatically wiping an automatic phonograph stylus that has just been utilized to play a recording is illustrated. Wiping of the stylus is achieved by a brush driving arrangement that is energized to move a brush across the stylus after the recording has been played. The apparatus is particularly adapted for use in association with a pick-up arm that has a stylus on either side thereof, and provision is made for insuring that the stylus that is wiped is that which has just been utilized in the playing of a recording.

This invention relates generally to the automatic cleaning of a stylus in a phonograph and, more particularly, to a stylus cleaning arrangement that automatically wipes clean a stylus that has just completed the playing of a record.

In an automatic record player of the type in which a selector mechanism selects records from a magazine and causes a pick-up arm to play a selected record, either side of each record can be played, as desired. The usual method of accomplishing the playing of both sides of a record is to provide a stylus on oppositely disposed sides of a single pick-up arm. One stylus is used for playing one side of a selected record, and the other stylus is used for playing the opposite side of the selected record, as required.

As in all types of record players, the styluses pick up dust and other foreign material which will cause distortion of the reproduced sound and on occasion permanent damage to the record being played. To prevent these undesirable occurrences, it is necessary to provide some method for cleaning the styluses to remove the accumulation of dust and foreign material thereon. This is usually accomplished by having brushes positioned on the selector mechanism to wipe the styluses when the pick-up arm carries the styluses past the brushes. The standard procedure is to have a brush stationed on either side of the record position, so that a raising of the pick-up arm will cause the stylus disposed away from the record to be wiped clean.

A major disadvantage of this approach is that the stylus cleaned is not that which has just finished the playing of a record. While this arrangement does provide for each stylus to be cleaned periodically if record selection is truly random (i.e., any given side is as likely to be selected as any other), in actual practice record selection tends to favor popular choices determined by listener preferences. For instance, if a plurality of records primarily involves more popular recordings on one corresponding side of each of the records, the stylus used on that side of the records could play several recordings before the stylus would be wiped clean by virtue of a selection included within the less popular sides. Thus, there is a chance that the sound would be distorted, or a record scratched, before the stylus could be cleaned.

The present invention obviates this difficulty and introduces other improvements in the wiping and cleaning of styluses.

Briefly, in a preferred embodiment described herein, the present invention utilizes a movable and positively driven brush structure for cleaning the particular stylus that has just played one side of a vertically disposed record. This embodiment is disclosed in the environment of conventional automatic phonograph of the type in which a movable selector carriage horizontally scans a storage magazine containing an aligned series of vertically disposed records and selects records therefrom for play in accordance with customer generated signals (although of course the invention could be readily adapted to horizontal record disposition by appropriate transposition of elements). The brush structure comprises two separate brushes mounted on either side of a base plate, thus providing for either stylus to be cleaned depending upon which stylus has just played a recording. The plate carrying the brushes is mounted on a support arm, which is connected through a linkage means to a pivoted crank member. The crank member has a cam shoulder formed thereon and situated adjacent a pair of flipper arms, or pawls, located on a cam wheel which is connected to a main cam shaft of the conventional phonograph selector mechanism. The main cam shaft is the shaft which controls the other functions of the selector mechanism, such as positioning the record adjacent a vertically disposed tone arm for play and returning the record to the storage magazine. By this arrangement, wiping by the brushes may be accurately timed so as not to interfere with any of the other functions which the selector mechanism must perform pursuant to the play of a record. Two pawls are utilized because the main cam shaft rotates in both directions, the direction of rotation depending upon which direction the selector carriage is moving during the indicated horizontal scanning of the storage magazine.

In order to have the brushes actuated only after completion of record play and not before, the flipper arm or pawl nearest to the cam shoulder of the crank member (regardless of direction of motion of the main cam shaft) will pivot upon contact with the shoulder. However, the contour of the cam wheel is such that the second pawl to contact the cam shoulder will not pivot but will instead cause the crank member to pivot. The crank member is spring biased to a rest position, and thus after the pawl which causes pivoting of the crank member has moved away from the cam shoulder, the crank member will be rapidly returned to its rest position. This movement produces a quick wiping action by the brush on its return stroke of the stylus that has just been utilized in the record play to better aid in removing any foreign material accumulated on that stylus.

Accordingly, it is a primary object of this invention to provide a stylus cleaner that will wipe and clean a stylus which has just played a record.

Another object of this invention is to provide a stylus cleaner that has a quick wiping action to enhance the cleaning action of the stylus.

Yet another object of this invention is to provide a stylus wiper that is controlled by the same arrangement that controls the performance of other functions after a record has been played, so that the cleaning action does not interfere with the performance of the other functions.

These and other objects, advantages, and features of the subject invention will hereinafter appear, and, for purposes of illustration, but not of limitation, an exemplary embodiment of the subject invention is shown in the appended drawings, in which.

Figure 1:
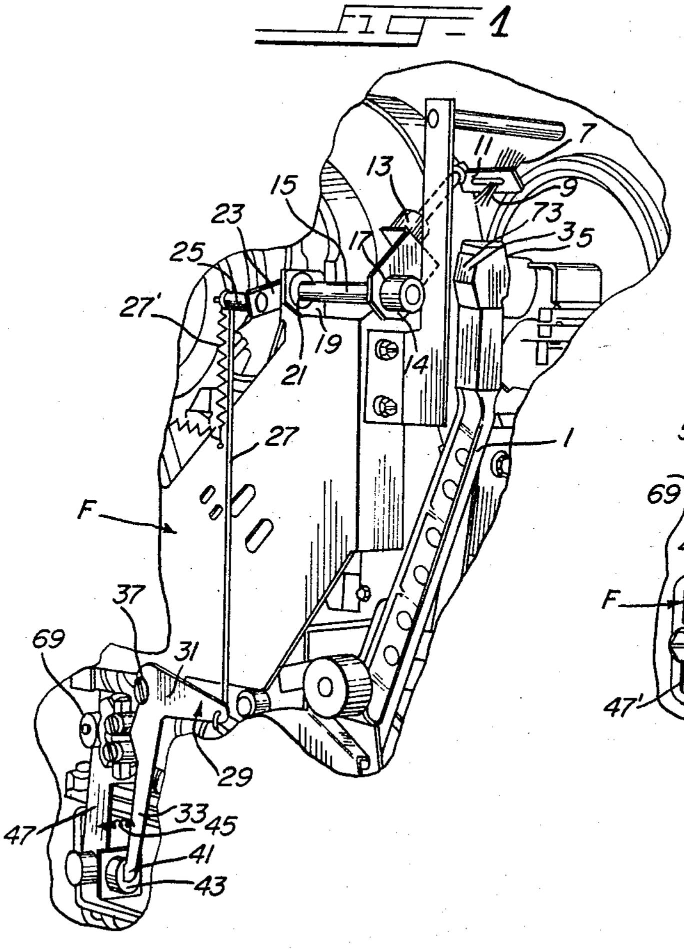
FIGURE 1 is a fragmentary perspective view of a portion of a conventional automatic record player including the novel stylus cleaning arrangement of this invention.

With reference to the perspective view of FIGURE 1, the elements constituting the present invention are shown in over-all combination. A phonograph pick-up arm 1 is shown in a normal, or rest, position corresponding to its FIGURE 3 disposition. A stylus support 3 and a stylus 73 carried thereon may be seen on pick-up arm 1. A similar stylus support 5 and stylus 75 is on the other side of pick-up arm 1; although not shown in FIGURE 1, stylus support 5 and stylus 75 may be seen in FIGURES 3–5.

Stationed above pick-up arm 1 is a wiping device comprising a pair of brushes 7 and 9. Brush 7 is arranged to cooperate with stylus 73 on stylus support 3, while brush 9 is arranged to cooperate with stylus 75 on stylus support 5. This disposition of the brushes in relation to the styluses may be better seen in FIGURES 3–5.

Figure 3:
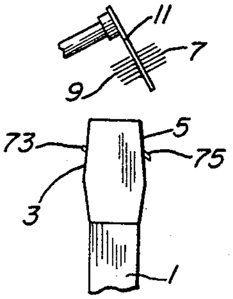
FIGURE 3 is a partial side view of the FIGURE 1 embodiment illustrating a phonograph pick-up arm and its associated styluses, in combination with wiping means of the type utilized in the preferred embodiment of this invention.
Figure 4:
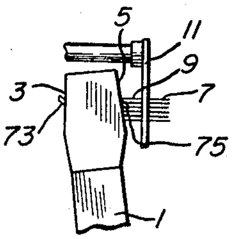
FIGURE 4 is a partial side view similar to FIGURE 3 showing the wiping means in position to clean one stylus.
Figure 5:
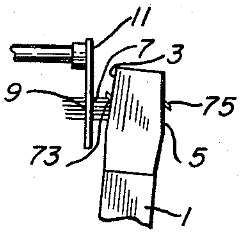
FIGURE 5 is a partial side view similar to FIGURE 4 showing the wiping means in position to clean the other stylus.

Brushes 7 and 9 are mounted on opposite sides of a movable base plate 11. Movable plate 11 is connected to a drive means for the cleaning arrangement through a supporting arm 13. When the drive means cause supporting arm 13 to rotate about its pivot end 14 (as hereinafter described), the movable plate 11 will rotate downwardly (as seen in FIGURES 1 and 3–5) until plate 11 is disposed essentially in alignment with a vertical plane in which pick-up arm 1 rotates, although as indicated the actual motion of plate 11 is along an arcuate path. The motion of plate 11 will cause one of the brushes 7, 9 to wipe clean its corresponding stylus 73, 75, depending upon which stylus has just been used to play a record. This is so because pick-up arm 1 will be displaced to the side of the record that was last played, that is, as in conventional practice, pick-up arm 1 is adapted to move in one vertical plane (corresponding to its FIGURE 4 disposition) for playing one side of a selected record with stylus 75 carried on stylus support 5 and to move in another vertical plane essentially parallel to the first (corresponding to its FIGURE 5 disposition) for playing an opposite side of a selected record with stylus 73 carried on stylus support 3. Thus if stylus 75 associated with stylus support 5 has just finished playing a side of a record, pick-up arm 1 will be displaced to that side of the record to disengage stylus 75 and return pick-up arm 1 to its rest or stand-by position. At this time plate 11 is moved by means of supporting arm 13, so that brush 9 can wipe clean stylus 75 associated with stylus support 5. Similarly, if stylus 73 associated with stylus support 3 had been the last to play a record, brush 7 would wipe that stylus to clean it. As shown in FIGURES 3–5, plate 11 is so positioned that the alternate wiping action may be achieved by the same arcuate motion of plate 11, the particular brush-stylus contact (i.e., 9–75 or 7–73) being determined by the plane of movement of pick-up arm 1.

Supporting arm 13 is driven through a linkage means including a rotatable shaft 15, which is fixedly connected to supporting arm 13 at point 17. Rotatable shaft 15 is also journaled in a support plate 19 of a frame F at 21. A pair of links 23, 25 connect rotatable shaft 15 to a rod 27 that is biased by a spring 27′ to a downward disposition (as seen in FIGURE 1). This composite linkage means connects supporting arm 13 to a pivoted crank element 29, as shown in FIGURE 1.

Figure 2:
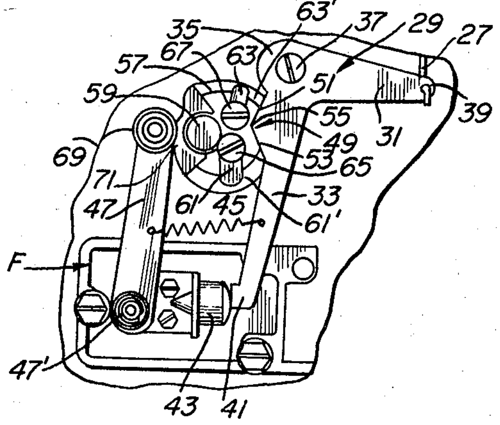
FIGURE 2 is an enlarged end view of the automatic record player showing the mechanical drive system illustrated in the lower left-hand portion of FIGURE 1.

FIGURE 2 shows that the pivoted crank element 29 comprises an L-shaped member having arms 31 and 33. Arms 31 and 33 are essentailly at right angles to each other and are unitarily connected at a common pivot end 35. A combined mounting pin and pivot 37 for the element 29 is also located at this point so that crank element 29 may pivot relative to frame F. Arm 31 is connected to rod 27 at end 39 of arm 31, opposite the common end 35. Arm 33 has a projection at its other end 41, which acts as a stop portion. The stop portion at end 41 of arm 33 abuts against a flexible stop 43 on frame F in the normal, or rest, position of pivoted element 29. Pivoted element 29 is spring biased to the rest position by a spring 45 connected between arm 33 and a brake arm 47 that is also pivotally mounted on frame F at 47′.

A shoulder 49 is formed on arm 33 of pivoted crank element 29. Shoulder 49 has a pair of sloping sides 51 and 53, which converge at a high point 55 of shoulder 49. Shoulder 49 serves as a cam through which the element 29 is caused to pivot.

The cam means for bearing against cam shoulder 49 to pivot crank element 29 are carried on a cam wheel 57. Cam wheel 57 is rotated by a conventional main cam shaft 59. The direction of rotation of main cam shaft 59 will depend upon which direction the phonograph selector carriage is moving, that is, cam wheel 57 will be rotated in either a clockwise or counterclockwise direction, depending upon the direction of horizontal motion of the conventional selector carriage mechanism. A pair of flipper arms, or pawls, 61 and 63 are pivotally mounted on cam wheel 57. A pair of pawls are provided because of the bi-directional rotation of main cam shaft 59, although, if shaft 59 rotated in only one direction, a single pawl would suffice.

Pawls 61, 63 are connected to cam wheel 57 by set screws 65, 67 respectively. Set screws 65, 67 also serve as pivot points for their associated pawls. Cam wheel 57 is contoured in such a manner that pawl 63 will pivot only in a counterclockwise direction, while pawl 61 will pivot only in a clockwise direction, as seen in FIGURE 2, that is, shoulder 63′, 61′ on cam wheel 57 impede clockwise and counterclockwise rotation, respectively, for pawls 63, 61.

To illustrate the operation of this cam arrangement, assume that main cam shaft 59 is rotating in a clockwise direction. As a result of the first 180° of rotation of main cam shaft 59, the conventional selector carriage is caused to position a selected record for play in a known manner. During this 180° of rotation, cam wheel 57 also will be rotated 180° in a clockwise direction and pawl 63 will contact side 51 of shoulder 49. However, pawl 63 is free to rotate in the counterclockwise direction so that pawl 63 drags over high point 55 and no displacement of element 29 occurs. After the selected record has been played, main cam shaft 59 is rotated the remaining 180° to return to its initial position. During this second 180° of rotation of shaft 59 and therefore of cam wheel 57, pawl 61 will come into contact with sloping side 51 of cam shoulder 49. However, pawl 61 can rotate only in the clockwise direction, not the counterclockwise direction, as a result of the previously described contouring of cam wheel 57 (i.e., shoulder 61′ thereof), so that crank element 29 is caused to pivot in a counterclockwise direction relative to frame F. Continued rotation of cam wheel 57 to its initial position will move pawl 61 past high point 55 of cam shoulder 49, at which time crank element 29 will rapidly return to its rest position as a result of the bias of spring 45.

If the main cam shaft 59 should rotate in the counterclockwise direction, the same sequence of events would occur except that pawl 63, rather than pawl 61, would cause the element 29 to be pivoted in the same way. After main cam shaft 59 has rotated one complete rotation, it is caused to remain in its initial position until another record is to be played, in accordance with conventional automatic record selection techniques. Thus, cam wheel 57 always returns to the position shown in FIGURE 2 after the playing of a record. By this arrangement, pivoting of crank element 29, and the consequent actuation of wiping brushes 7 and 9, is precisely timed with respect to the cam actuation of other functions that must be accomplished pursuant to the playing of a record. Therefore, the cleaning action of the brushes does not interfere with these other functions.

A roller cam 69 on brake arm 47 contacts a cam surface 71 on the cam wheel 57. Brake arm 47 serves as a drag to slow down the cam action. Brake arm 47 is a conventional type of drag arrangement and constitutes no part of the present invention.

With the aid of FIGURES 3–5, the exact wiping function may be more fully explained. At the completion of the playing of a record, main cam shaft 59 begins to rotate through its second 180° to return the record to the magazine and cause other necessary functions to be performed. During the first part of the final 180° of rotation of main cam shaft 59, crank element 29 is maintained in the rest position shown in FIGURE 2. At a point in the rotation of shaft 59 corresponding to a time at which any function with which the wiping action might interfere is completed, an appropriate one of the pawls 61, 63 contacts cam shoulder 49 on crank element 29 and causes that element 29 to be pivoted.

Before element 29 is pivoted, brushes 7 and 9 are in the rest or stand-by position shown in FIGURE 3. As previously indicated, brush 9 is associated with stylus 75 on stylus support 5, while brush 7 is associated with stylus 73 on stylus support 3. If stylus 75 has just completed playing a record, pick-up arm 1 is displaced to that side of the record (i.e., to the position shown in FIGURE 4). Also, due to the time lag inherent in the cam action associated with crank element 29, pick-up arm 1 is returned to its rest or normal position before crank element 29 is displaced. As crank element 29 is pivotally displaced by one of the pawls 61, 63, movable plate 11 will be moved to the position shown in FIGURE 4. This motion is a relatively slow one due to the relatively slow rotation of main cam shaft 59. As the pawl which is causing crank element 29 to pivot passes high point 55 of cam shoulder 49, spring 45 will cause crank element 29 to return to the position shown in FIGURE 2 with a relatively rapid motion. Thus, plate 11 is rapidly returned to the position shown in FIGURE 3 and brush 9 applies a quick wiping action to stylus 75. This quick wiping action serves to "scrub" the stylus 75 and help remove any extraneous foreign material that was missed during the initial slow wiping action. In the same manner, stylus 73 could be wiped by brush 7 (as shown in FIGURE 5) if stylus 73 had just finished playing a record, rather than stylus 75.

It should be understood that the embodiment described is merely exemplary oft he preferred practice of the present invention and that various changes, modifications, and variations may be made in the arrangements, operations, and details of construction of the elements disclosed herein, without departing from the spirit and scope of the present invention.

What is claimed is:

1. A stylus cleaning arrangement for a phonograph record player pick-up arm having a stylus on either side thereof and adapted to move in one plane for playing one side of a selected record and to move in another plane for playing an opposite side of a selected record comprising:

wiping means for cleaning the styluses;

a movable member on which said wiping means are mounted and which is normally stationed in a rest position; and drive means for displacing the movable member from its rest position after the playing of a record to cause said wiping means to wipe a stylus that has just finished playing a record.

2. A stylus cleaning arrangement as recited in claim 1 wherein said drive means displaces said movable member relatively slowly and further comprising:

resetting means for returning the movable member to its rest position with a relatively fast motion to cause the wiping means to exhibit a quick wiping action during resetting.

3. A stylus cleaning arrangement as recited in claim 2 wherein:

the movable member comprises a plate connected to the drive means through a supporting arm; and the wiping means comprises a first brush mounted on one side of the plate and a second brush mounted on the other side of the plate.

4. A stylus cleaning arrangement as recited in claim 3 wherein:

the phonograph record player includes a motor powered selector member having a main cam shaft for controlling the playing of records; and the drive means is operatively connected to said main cam shaft.

5. A stylus cleaning arrangement as recited in claim 3 wherein the drive means comprises:

a pivoted crank element;

linkage interconnecting the supporting arm and the crank element; and a cam for supporting the crank element so as to effect movement of the supporting arm and therefore of the brush-carrying plate connected to the supporting arm.

6. A stylus cleaning arrangement as recited in claim 5 wherein the pivoted crank element comprises:

an L-shaped member having first and second arms connected together at a common end and located substantially at right angles to each other;

the L-shaped member being pivoted at the common end of said arms, and the other end of the first arm being connected to the linkage;

a stop portion at the other end of the second arm for limiting the motion of the L-shaped member in one direction; and a cam shoulder located intermediate the ends of the second arm and having a pair of sloping sides.

7. A stylus cleaning arrangement as recited in claim 6 wherein the cam means comprises:

a cam wheel selectively rotatable in either of both directions of rotation;

a pair of pivoted pawls located on the cam wheel adjacent the cam shoulder on the L-shaped member; and a positioning stop on the cam wheel for each pawl to provide that each pawl will pivot in only one direction, each pawl pivoting in a direction opposite to the direction of pivoting of the other pawl, whereby rotation of the cam wheel will produce an action in which the second pawl to contact one of the sloping sides of the cam shoulder on the L-shaped member will cause the L-shaped member to pivot and provide a resultant displacement of the brushes.

8. A stylus cleaning arrangement as recited in claim 7 and further comprising:

a biasing spring connected ot the second arm of the L-shaped member to cause the L-shaped member to rapidly return to a position with the stop portion thereof abutting a stationary stop, after the pawl pivoting the L-shaped member has moved away from the sloping side of the shoulder on the L-shaped member which it is contacting, whereby the brushes are caused to exhibit a quick wiping action.

References Cited

UNITED STATES PATENTS 2,881,005 5/1959 Michalko et al. -------- 274—37

FOREIGN PATENTS 703,731 2/1965 Canada.

LEONARD FORMAN, *Primary Examiner.*

FELIX J. D'AMBROSIO, *Assistant Examiner.*